Sept. 27, 1960

A. W. WARNER, JR

CRYSTAL UNIT MOUNTING

Filed May 15, 1956

2,954,490

INVENTOR
A. W. WARNER, JR.
BY John C. Morris
ATTORNEY

United States Patent Office 2,954,490
Patented Sept. 27, 1960

2,954,490
CRYSTAL UNIT MOUNTING

Arthur W. Warner, Jr., Whippany, N.J., assignor to Bell Telephone Laboratories, Incorporated, New York, N.Y., a corporation of New York Filed May 15, 1956, Ser. No. 584,935
11 Claims. (Cl. 310—9.1)

Figure 1:
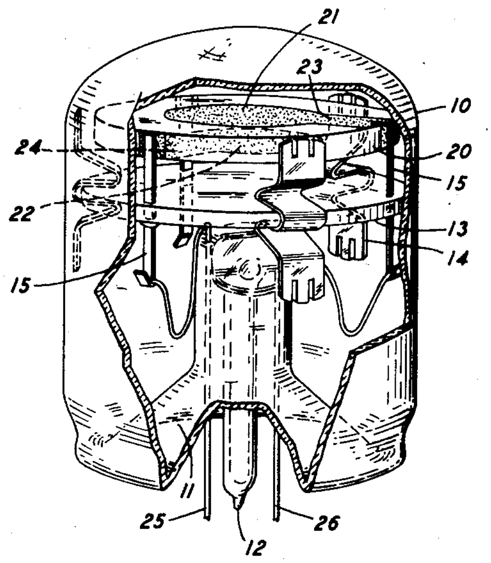

This invention relates to piezoelectric crystals and more particularly to a crystal and mounting assembly.

A piezoelectric crystal unit that is intended to serve as a primary frequency standard must, in addition to including a precisely dimensioned crystal plate, be mounted in a manner to allow expansion and contraction of the plate with temperature variations without distortion of the mounting and consequent overstressing of the crystal plate with resulting constraint of its freedom to vibrate at the intended frequency. It is necessary that such a crystal be subjected to environmental conditions that are controlled as much as possible, which includes mounting and sealing within a suitable container with a minimum of parts and of surfaces that would serve as sources of contamination.

Piezoelectric crystal plates of large size have heretofore been mounted by resilient means, such as spring wires, and have been protected from shock and severe vibration by an elaborate system of stops and bumpers, which introduced possible sources of contamination.

Accordingly, an object of this invention is to facilitate the mounting of high precision crystals with a minimum of constraint thereon.

In accordance with one illustrative embodiment of this invention, a circular quartz crystal plate designed to vibrate in high frequency shear at frequencies in the order of 2 to 5 megacycles per second is mounted at its edge on three metallic ribbons oriented to allow radial expansion and contraction of the crystal while restraining it from translation or rotation. The ribbons are erected in equally spaced array around the periphery of a circular mounting plate of about the same diameter as the crystal. The mounting plate, advantageously of insulating material, is secured within a cylindrical envelope by three resilient members bearing against its inner surface. Electrical connections may be made to the electrodes of the crystal via the mounting ribbons. The header is sealed into the envelope at a zone relatively remote from the crystal and on the opposite side of the mounting plate from the crystal.

Piezoelectric crystal plates designed to vibrate in high frequency shear, are advantageously discs having one flat and one convex face. Such plates may be circular, oval, or of other outline as may be dictated by use, fabrication requirements, et cetera. For convenience of description herein the crystal plate has been considered as if it were a flat disc or plate. Thus, descriptions as to relative location of parts with respect to the crystal plate or disc may refer to the "plane" or to the "face" of the plate or disc. Such references are not intended to be taken in a strict geometrical sense but as a simple and convenient way of defining relative orientation of the various parts of the assembly.

A feature of this invention resides in a mounting for a crystal plate, which mounting comprises a plurality of supporting members, spaced, shaped, and oriented to allow substantially free expansion and contraction of the crystal, while inhibiting its movement otherwise, thereby minimizing strains which would affect the elastic properties of the crystal and hence its freedom to vibrate at its intended frequency.

Another feature of the invention involves a plate of insulating material resiliently secured in a protecting envelope to serve as a mounting plate.

Figure 2:
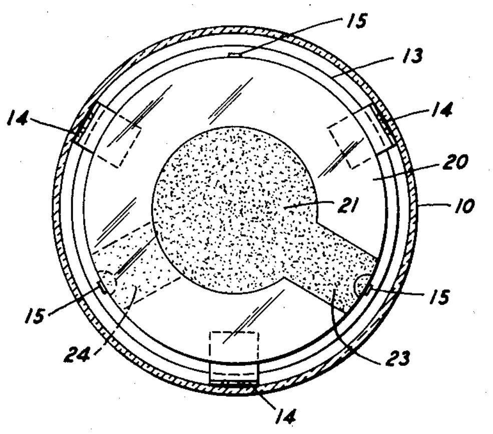

Other and further objects and features of this invention will appear more fully and clearly from the following detailed description of an exemplary embodiment thereof considered with the appended drawing in which:

Fig. 1 is a perspective view of a crystal mounting illustrative of this invention with certain parts broken away to show details; and Fig. 2 is a top view of the device of Fig. 1 with a portion of the envelope broken away.

As illustrated, the glass bulb or envelope 10 is cylindrical with a domed top and a reentrant, generally conical header 11 sealed in its open end. The envelope is evacuated by way of the tubulation 12 prior to final sealing.

A mounting plate 13 of somewhat less diameter than the envelope 10 is secured in place by means of a plurality of spring clips 14, advantageously three, which are arranged at equal intervals around the periphery of the plate 13. The plate is advantageously of a heat resistant glass or like insulating material.

The clips 14 are of M or W shape with their inner legs oriented to grip the mounting plate and their outer legs bent outward to fit against the wall of the envelope. The outwardly bent portions of the clips may be slotted so that they will conform better to the curvature of the envelope wall. Suitable materials for the clips 14 are beryllium copper, phosphor bronze, or spring steel.

Erected around the edge of the plate 13 midway between the clips 14 are the ribbons 15. These ribbons or support members may be inserted in slots adjacent the edge of the plate 13, as shown in the drawing, or in notches in said edge. In either case the ribbons are secured to the plate by soldering to a film of heat fused metallic material such as a mixture of silver and glass. The supporting ribbons 15 are directed at right angles to the plane of the plate 13 with their flat faces perpendicular to radii of the plate. The ribbons 15 should have a width much greater than their thickness, which has been exaggerated in the drawing in the interest of clarity of description. The ratio of width to thickness may be varied in dependence upon the stiffness and strength requirements needed for inhibition of undesired motion. In all cases, however, the thickness should be such as to allow the required expansion and contraction of the crystal plate. Suitable material for the ribbon is beryllium copper, phosphor bronze, or spring steel.

A circular crystal 20 having electrodes 21 and 22 on its opposite faces is secured at equidistant points on its periphery to support ribbons 15. The ribbons are secured to metallized zones on the edge of the crystal by solder. The electrodes 21 and 22 have portions 23 and 24 extending to the edge of the crystal and in contact respectively with the metallized zones so that electrical connections can be made to them by the support ribbons. As is the case with the mounting plate, the ribbons 15 are oriented at right angles to the plane of the crystal, each ribbon with its broad face perpendicular to a radius of the crystal.

The external leads 25 and 26 are sealed through the header 11 in a manner common to that found in vacuum tube structures. These leads are respectively connected, as by solder or a weld, to the downward extensions of the two ribbons 15 that are connected to the electrode extensions 23 and 24. In the interest of stability of the assembly during insertion into the envelope a third dummy lead may be secured to the remaining support ribbon.

A device in accordance with this invention may be assembled in the following manner: a circular quartz crystal suitably sized and finished is metallized at equidistant points on its edge, three points for the device illustrated. This may be done with material called silver paste, which comprises glass and silver in a finely divided state, mixed with a flux and a vehicle. The paste is applied to proper zones and then fused at about 550 degrees centigrade. One each of two of the metallized zones extends for a short distance onto the respective faces of the crystal for making connection to the extended portions of the electrodes.

The electrodes are then applied by a suitable process, such as vapor deposition, each eelctrode having an extension connecting respectively to each of the previously mentioned metallized zones. Gold is a suitable electrode material.

The mounting plate is also metallized at the zones where the support ribbons are to be attached. The ribbons are then soldered to the plate and to the crystal.

The lower ends of the appropriate support ribbons are then soldered or welded to the leads that pass through the header. As shown in the drawing, the leads may be bent to have a knee or loop portion closely adjacent to or in light contact with the bottom of the mounting plate.

The clips are then applied to the edge of the mounting plate, and the assembly is inserted into the envelope.

The header is then sealed to the envelope by conventional means used in vacuum tube manufacture. The use of a reentrant header provides a long heat conductive path between the glass sealing zone and the crystal. The mounting or support plate acts as a protective baffle between the sealing zone and the crystal.

The envelope is then evacuated, baked, and sealed off at the tubulation. The completed device may be mounted in any suitable manner.

A particular device in accordance with this invention may comprise a circular quartz crystal plate 30 millimeters (1.18 inches) in diameter and 3.4 millimeters (0.133 inch) thick having vapor deposited gold electrodes on either face. The crystal is mounted on three beryllium copper support ribbons 0.060 inch wide and 0.002 inch thick. The mounting plate or baffle may be of Pyrex glass 1.25 inches in diameter and 0.0625 inch thick. The spring clips are of 0.007 inch beryllium copper about 0.1875 inch wide. The glass bulb or envelope is 1.375 inches in diameter and about 2 inches long. For crystals of different size some accompanying differences of dimensions in the mounting means are to be expected.

It is to be understood that the above-described arrangements are illustrative of the application of the principles of the invention. Numerous other arrangements may be devised by those skilled in the art without departing from the spirit and scope of the invention.

What is claimed is:

1. A crystal and mounting assembly comprising a cylindrical envelope having a header sealed in one end, a circular mounting plate of insulating material, three equally spaced resilient securing clips embracing the edge of the plate and bearing against the envelope, three supporting members secured adjacent the edge of the plate between adjacent clips and equally spaced therefrom, said supporting members directed at right angles to the plane of the plate, a generally flat symmetrical crystal having electrodes on its faces and secured at equally spaced points of its edge to the supporting members, said electrodes electrically connected respectively to two supporting members, and leads passing through the header and connected respectively to said two supporting members.

2. A crystal and mounting assembly comprising a cylindrical envelope having a header sealed in one end, a circular mounting plate of insulating material, equally spaced resilient securing clips embracing the edge of the plate and bearing against the envelope, supporting members secured adjacent the edge of the plate between adjacent clips and equally spaced therefrom, said supporting members directed at right angles to the plane of the plate, a generally flat symmetrical crystal having electrodes on its faces and secured at equally spaced points of its edge to the supporting members, said electrodes electrically connected respectively to supporting members, and leads passing through the header and connected respectively to said supporting members.

3. A crystal and mounting assembly as in claim 2 in which the supporting members are flat metallic ribbons mounted with their faces perpendicular to radii of the mounting plate and of the crystal.

4. A crystal and mounting assembly as in claim 2 in which the supporting members are flat metallic ribbons of a width several orders greater than their thickness.

5. A crystal and mounting assembly comprising a cylindrical envelope having a header sealed in one end, a circular mounting plate of heat resistant glass, spaced resilient securing clips embracing the edge of the plate and bearing against the envelope, metal supporting ribbons secured adjacent the edge of the plate between adjacent clips, said ribbons directed at right angles to the plane of the plate, a symmetrical crystal having electrodes on its faces, secured at spaced points of its edge to the supporting members and oriented in parallel relation to said plate, said electrodes electrically connected respectively to supporting members, and leads passing through the header and connected respectively to said supporting members.

6. A crystal and mounting assembly comprising an envelope having a header sealed in one end, a mounting plate of insulating material, spaced resilient securing clips embracing the edge of the plate and bearing against the envelope, supporting members secured adjacent the edge of the plate between adjacent clips and spaced therefrom, a generally flat crystal having electrodes on its opposite faces and secured at spaced points of its edge to the supporting members, said supporting members directed at right angles to the faces of the plate and of the crystal, said electrodes electrically connected respectively to supporting members, and leads passing through the header and connected respectively to said supporting members.

7. A piezoelectric crystal and mounting means therefor comprising an evacuated cylindrical glass bulb having a header sealed in one end, a glass mounting disc, three equally spaced resilient clips each having an intermediate portion gripping the edge of the disc and slotted end portions bearing against and conforming to the inner surface of the bulb, three equally spaced metallic ribbons secured to the disc at its periphery at points equidistant from adjacent clips, said ribbons oriented at right angles to the plane of the disc with their faces perpendicular to radii of the disc, said crystal being generally flat and circular with an electrode on each face, said crystal secured at equidistant peripheral zones to the ribbons and in spaced relation to the disc, said electrodes electrically connected respectively to two of said ribbons, and conductors passing through the header with their inner ends connected respectively to said two ribbons.

8. A piezoelectric crystal and mounting means therefor comprising an evacuated bulb having a header sealed in one end, a mounting disc of heat resistant insulation, three spaced resilient clips each having an intermediate portion gripping the edge of the disc and end portions bearing against and confronting to the inner surface of the bulb, spaced metallic ribbons secured to the disc at its periphery intermediate the clips, said crystal being generally flat with an electrode on each face and secured at spaced peripheral zones to the ribbons and in spaced relation to the disc, said ribbons oriented at right angles to the plane of the disc and of the crystal with their faces in alignment with the edge of the disc and of the crystal, said electrodes electrically connected respectively to said ribbons, and conductors passing through the header with their inner ends connected respectively to said ribbons.

9. A piezoelectric crystal and mounting means therefor comprising an evacuated cylindrical glass bulb having a header sealed in one end, a glass mounting disc, at least three equally spaced resilient clips each having an intermediate portion gripping the edge of the disc and slotted end portions bearing against and conforming to the inner surface of the bulb, at least three equally spaced metallic ribbons secured to the disc at its periphery at points equidistant from adjacent clips, said ribbon oriented at right angles to the plane of the disc with their faces perpendicular to radii of the disc, said crystal being flat and circular with an electrode on each face, said crystal secured at equidistant peripheral zones to the ribbons and in spaced relation to the disc, said electrodes electrically connected respectively to two of said ribbons, and conductors passing through the header with their inner ends connected respectively to said two ribbons.

10. A piezoelectric crystal and mounting means therefor comprising an envelope having a header sealed in one end, a mounting disc, equally spaced resilient clips each having an intermediate portion gripping the edge of the disc and end portions bearing against and conforming to the inner surface of the envelope, equally spaced metallic ribbons secured to the disc at its periphery at points equidistant from adjacent clips, said ribbons oriented at right angles to the plane of the disc with their faces perpendicular to radii of the disc, said crystal having electrodes on opposite faces and being secured at equidistant peripheral zones to the ribbons and in spaced relation to the disc, said electrodes electrically connected to respective ribbons, and conductors passing through the header with their inner ends connected to said respective ribbons.

11. A crystal and mounting assembly comprising a cylindrical envelope having a header sealed in one end, a circular mounting plate of insulating material, spaced resilient securing clips each having an intermediate portion embracing the edge of the plate and end portions bearing against the side wall of the envelope to secure the plate in substantially perpendicular relation to the axis of the envelope, supporting ribbons of conductive material each having an end secured to the plate adjacent the edge thereof and between adjacent clips, said supporting ribbons directed at right angles to the plane of the plate, a generally flat and circular crystal having electrodes on its faces and secured at spaced zones of its edge to the other ends of said ribbons, and means including said ribbons for making electrical connection from the electrodes to the outside of said envelope.

References Cited in the file of this patent

UNITED STATES PATENTS

| | | |
|---|---|---|
| 1,969,339 | Usselman | Aug. 7, 1934 |
| 2,167,852 | Rose | Aug. 1, 1939 |
| 2,275,122 | Ziegler | Mar. 3, 1942 |
| 2,285,796 | Beardow | June 9, 1942 |
| 2,484,428 | Smith | Oct. 11, 1949 |
| 2,784,326 | Purdue | Mar. 5, 1957 |
| 2,877,370 | Hanson | Mar. 10, 1959 |